(12) United States Patent
Moos et al.

(10) Patent No.: US 12,263,716 B2
(45) Date of Patent: Apr. 1, 2025

(54) VENTILATION SYSTEM FOR A MOTOR CAR, IN PARTICULAR FOR A PASSENGER CAR, AND MOTOR CAR WITH SAID VENTILATION SYSTEM

(71) Applicant: Daimler AG, Stuttgart (DE)

(72) Inventors: Oliver Moos, Stuttgart (DE); Christoph Menzel, Stuttgart (DE); Rahul Ganuga, Bengaluru (IN); Valentin Maier, Ispringen (DE); Joachim Currle, Stuttgart (DE)

(73) Assignee: Daimler AG, Stuttgart (DE)

( * ) Notice: Subject to any disclaimer, the term of this patent is extended or adjusted under 35 U.S.C. 154(b) by 324 days.

(21) Appl. No.: 17/635,607

(22) PCT Filed: Jul. 31, 2020

(86) PCT No.: PCT/EP2020/071662
§ 371 (c)(1),
(2) Date: Feb. 15, 2022

(87) PCT Pub. No.: WO2021/032442
PCT Pub. Date: Feb. 25, 2021

(65) Prior Publication Data
US 2022/0305879 A1    Sep. 29, 2022

(30) Foreign Application Priority Data
Aug. 16, 2019  (DE) .................. 10 2019 005 728.7

(51) Int. Cl.
*B60H 1/00* (2006.01)
*B60H 1/24* (2006.01)
(Continued)

(52) U.S. Cl.
CPC ......... *B60H 1/00564* (2013.01); *B60H 1/242* (2013.01); *B60K 35/00* (2013.01); *B60K 35/22* (2024.01); *B60K 2360/658* (2024.01)

(58) Field of Classification Search
CPC .... B60H 1/00564; B60H 1/242; B60K 35/00; B60K 35/22
See application file for complete search history.

(56) References Cited

U.S. PATENT DOCUMENTS

| 5,649,860 | A | 7/1997 | Giuffrida |
| 11,034,214 | B2 * | 6/2021 | Fusco .................... B60K 35/50 |
| 2019/0100078 | A1 | 4/2019 | Fusco et al. |

FOREIGN PATENT DOCUMENTS

| DE | 202014007673 U1 * | 2/2016 | ............. B60H 1/242 |
| DE | 102015200286 A1 * | 7/2016 | ......... B60H 1/00271 |

(Continued)

OTHER PUBLICATIONS

PCT/EP2020/071662, International Search Report dated Nov. 10, 2020 (Two (2) pages).

(Continued)

*Primary Examiner* — Allen R. B. Schult
(74) *Attorney, Agent, or Firm* — Crowell & Moring LLP

(57) ABSTRACT

A ventilation system for a motor car includes an electronic display for displaying information and an air distribution chamber disposed on a back of the electronic display where air from the air distribution chamber is flowable through an air outlet and into an internal space of the motor car. An air calming chamber is disposed on a back of the air distribution chamber. The air calming chamber is at least partially separated fluidically from the air distribution chamber and is connected fluidically to the air distribution chamber via at least one through hole where via the at least one through (Continued)

hole the air distribution chamber is suppliable with air to be supplied to the internal space from the air calming chamber.

10 Claims, 6 Drawing Sheets

(51) Int. Cl.
  *B60K 35/00*  (2024.01)
  *B60K 35/22*  (2024.01)

(56) References Cited

FOREIGN PATENT DOCUMENTS

| | | |
|---|---|---|
| JP | 2008-286494 A | 11/2008 |
| KR | 10-2015-0022103 A | 3/2015 |
| WO | WO 01/98097 A1 | 12/2001 |
| WO | WO 2017/199655 A1 | 11/2017 |

OTHER PUBLICATIONS

German-language German Office Action issued in German application No. 10 2019 005 728.7 dated Jun. 14, 2021 (Four (4) pages).
Chinese-language Chinese Office Action issued in Chinese Application No. 202080057650.3 dated Aug. 14, 2024 (9 pages).

\* cited by examiner

VENTILATION SYSTEM FOR A MOTOR CAR, IN PARTICULAR FOR A PASSENGER CAR, AND MOTOR CAR WITH SAID VENTILATION SYSTEM

BACKGROUND AND SUMMARY OF THE INVENTION

The invention relates to a ventilation system for a motor car. The invention further relates to a motor car.

WO 2017/199655 A1 discloses an air outlet device for a vehicle with an electronic display, which has a display area for displaying information. In addition, an air outlet for air is provided.

Moreover, a display unit for displaying image data on a display is known from DE 10 2015 200 286 A1.

The aim of the present invention is to provide a ventilation system and a motor car, so that the internal space of the motor car can be supplied with air particularly advantageously.

A first aspect of the invention relates to a ventilation system for a motor car, preferably configured as a passenger car. The ventilation system has at least one electronic displaying means, which for example is also called a display, and at least one display area for displaying information, in particular for displaying information electrically or electronically. In particular, letters and/or symbols and/or images or the like can be displayed on the display area, in order to supply information for example to persons present in the internal space of the motor car. The ventilation system has in addition an air distribution chamber that is suppliable with air, which is arranged on a back of the display opposite the display area. This means that in its fully manufactured state the motor car has the ventilation system and therefore the display and the air distribution chamber. The back of the display is then turned away from the internal space, in particular in the vehicle's longitudinal direction. For example, the back faces forwards in the vehicle's longitudinal direction. The ventilation system has additionally at least one air outlet adjacent to an edge region of the display, through which air from the air distribution chamber can flow, which is preferably arranged as a slot, i.e., as an air outlet slot. This slot may be both continuous and intermittent. The air flowing through the air outlet can be led via the air outlet from the air distribution chamber into the internal space of the motor car. In other words the air from the air distribution chamber can flow through the air outlet and therefore flow through the air outlet and thus flow into the internal space of the motor car, so that the internal space is ventilated.

Now, in order to be able to achieve a particularly advantageous supply of the internal space with air, i.e., a particularly advantageous ventilation of the internal space, it is envisaged according to the invention that the ventilation system has at least one air calming chamber, separated fluidically at least partly, in particular primarily, from the air distribution chamber, which is arranged on a second back of the air distribution chamber turned away from the back of the display. In other words the back of the display is also designated as the first back. The first back is for example turned towards the air distribution chamber and delimits for example the air distribution chamber partly directly, so that for example the air taken up into the air distribution chamber or the air flowing through the air distribution chamber comes into direct contact with the first back of the display. As an alternative to direct contact, an insulation layer or an air gap may be arranged between the air and the first back.

The air distribution chamber has for example a second back, which is turned away from the first back. The aforementioned air calming chamber is arranged on the second back, which is separated fluidically at least partly, in particular primarily, from the air distribution chamber. The air calming chamber is connected fluidically to the air distribution chamber via at least one through hole, so that the air distribution chamber is suppliable via the through hole with the air that is to be supplied to the internal space. This means that the air to be supplied to the internal space is first supplied to the air calming chamber, i.e., is led into the air calming chamber. In the air calming chamber, the air that is led or has been led into the air calming chamber can be calmed. Then the air can be led or can flow from the air calming chamber into the air distribution chamber, wherein the air then flows from the air distribution chamber to and in particular through the air outlet. The air calming chamber is thus used for example for calming the air first, before the air is supplied to the air distribution chamber. As a result, the flow velocity can be reduced and therefore the pressure loss can be lowered. In consequence, the internal space can be ventilated particularly advantageously and in particular especially pleasantly for persons present in the internal space.

The air outlet is delimited at least partly directly by the edge region of the display.

So as to be able to ventilate the internal space especially favourably with respect to space and therefore particularly advantageously, in an advantageous embodiment of the invention it is envisaged that the air distribution chamber extends in an air distribution plane and the air calming chamber extends in an air calming plane extending in parallel to the air distribution plane. The air distribution plane is also designated as the first plane, and the air calming plane is also designated as the second plane. With this sequence and with this arrangement of the air distribution chamber in the first plane and of the air calming chamber in the second plane, an especially flat structure of the ventilation system, which is therefore favourable with respect to space, can be achieved in particular in a direction extending perpendicularly to the planes, so that the internal space can be ventilated especially favourably with respect to space and therefore particularly advantageously. In addition, as will be explained in more detail hereunder, a modular construction of the ventilation system can be presented, so that for example the ventilation system can be adapted easily and especially in compliance with requirements for different applications. In particular, the ventilation system can be appropriately varied particularly easily and therefore for example can be used for different vehicle variants. In particular, the invention makes it possible to devise a kind of sandwich construction of the ventilation system, so that the ventilation system may for example be installed or fitted especially efficiently. In the sandwich construction, the planes for example represent respective layers and/or cores, which for example are arranged between respective covering layers. As a result, an especially simple and modular and therefore easily variable construction may be presented, so that particularly advantageous ventilation of the internal space can be achieved.

Moreover, it has been shown to be particularly advantageous if the display area extends in a display plane extending in parallel to the air distribution plane and in parallel to the air calming plane. The display plane is also designated as the third plane. As a result, particularly advantageously a layered or sandwich construction of the ventilation system may be presented, so that the internal space can be ventilated particularly advantageously and in particular in a simple manner, and favourably with respect to space.

In a particularly advantageous embodiment of the invention, in the aforementioned direction extending perpendicularly to the air distribution plane and perpendicularly to the air calming plane, which is also designated as the separating direction, the air distribution chamber and the air calming chamber are separated from one another at least partly, in particular primarily, by a separating element. The separating element is preferably a solid body. In particular, the separating element is inherently rigid and therefore dimensionally stable. Moreover, the separating element has the through hole, which is preferably configured as a passage and therefore passes completely through the separating element. In other words the through hole is formed in the separating element and configured as a passage. Preferably the through hole is delimited in its peripheral direction all round by the separating element, i.e., by a wall of the separating element. The separating element extends preferably at least mainly, in particular completely, in a separating plane arranged extending in the separating direction between the air distribution plane and the air calming plane and in parallel to the air distribution plane and in parallel to the air calming plane, which is also designated as the fourth plane. As the separating element extends at least mainly in the separating plane, the separating element is for example a plate-like or plate-shaped component, which for example is configured as a surface element. As a result, a particularly advantageous modular and in particular sandwich-like construction can be achieved. The separating element is, for example for the air distribution chamber and/or the air calming chamber, a covering surface or covering layer of the sandwich structure, which is also designated as sandwich construction. The air distribution chamber is then arranged for example in particular in the separating direction between the display, in particular the first back of the display, and the separating element, in particular a front side of the separating element facing the first back. Thus, for example the air distribution chamber is an in particular first core of the sandwich structure, which is arranged in the separating direction between the display and the separating element. Therefore, for example the display, which is preferably configured as a solid body and/or is inherently rigid, is a further covering surface or covering layer for the air distribution chamber, wherein the respective covering surface or covering layer is a constituent of the sandwich structure. As a result, a particularly advantageous modular structure may be presented in a particularly advantageous sandwich construction of the ventilation system. Preferably the display and the separating element are formed separately from one another and joined together at least indirectly.

For example, a delimiting element is provided, which is for example spaced from the separating element in the separating direction. The delimiting element is preferably a solid body and/or is inherently rigid, i.e., dimensionally stable. The delimiting element is for example a further, third covering layer or covering surface of the sandwich structure, wherein the delimiting element is for example a covering surface or a covering layer for the air calming chamber. The air calming chamber is for example arranged in the separating direction between the separating element, in particular a back of the separating element turned away from the front side of the separating element, and the delimiting element, in particular a front side of the delimiting element facing the separating element, so that for example the air calming chamber is a second core of the sandwich structure arranged between the separating element and the delimiting element.

The delimiting element then extends preferably in a delimiting plane, which is also designated as the fifth plane and for example extends in parallel to the first plane, in parallel to the second plane and in parallel to the third plane.

In order to be able to achieve a particularly advantageous supply of the internal space with air, in particular in accordance with the requirements, it is envisaged in a further embodiment of the invention that the air distribution chamber is divided into several partial chambers arranged adjacently, wherein at least one through hole is provided for each partial chamber, via which the respective partial chamber is connected fluidically to the air calming chamber and is suppliable with the air that is to be supplied to the internal space. The above and following configurations of the aforementioned first through hole also apply directly to the other through holes, and vice versa.

It has been shown to be particularly advantageous if, for subdividing the air distribution chamber, the partial chambers, in a subdividing direction extending in the air distribution plane, are separated from one another by at least one partition that is preferably configured as a solid body and/or is inherently rigid, wherein the partial chambers are completely separated from one another fluidically in the subdividing direction by means of the partition. Preferably the partition per se or the material from which the partition is formed is impermeable to air. Alternatively or additionally, the partition is for example formed integrally with the separating element. Through the subdivision of the air distribution chamber, the air can be directed particularly appropriately and in a targeted manner, so that the internal space can be ventilated particularly advantageously.

A further embodiment is characterized in that the air distribution chamber and the air calming chamber on the back of the display extend at least over most of its area, i.e., at least over a main part of the area of the display. This means that the air distribution chamber and the air calming chamber, in particular in the air distribution plane and the air calming plane, extend at least over more than the half the area of the display. As a result, the air can be distributed particularly advantageously and uniformly and can subsequently be supplied to the internal space, in particular at various places.

In particular, it is conceivable for the ventilation system to have several air outlets, to which the foregoing and the following details regarding subdividing can be applied to the at least one air outlet, and vice versa.

In order to be able to supply the internal space, in particular via the multiple air outlets functioning as vents or air vents and configured for example as air outlet slots, particularly advantageously with air, it is envisaged in a further embodiment of the invention that the ventilation system has a blower arranged outside of the air distribution chamber and outside of the air calming chamber and in particular in a box, also designated as air conditioning box, by means of which the air to be supplied to the internal space is delivered and can thus be provided. At least two line elements are provided, which in each case have at least or exactly one air duct, through which air can flow that is to be supplied to the internal space. The respective air duct is suppliable at one end with the air provided by the blower. The air conditioning box delimits for example a receiving space, through which the air delivered by means of the blower can flow. For example, the blower is arranged in the receiving space and holds the air to be supplied to the internal space ready in the receiving space. For example, the respective air duct is connected fluidically to the receiving space at one end, so that the air at least partially flowing through the receiving space and delivered by means of the blower can flow into the respective air duct at one end. Then the air that flowed into the respective air duct at one end flows through the air duct and therefore the respective line element. At the other end the respective air duct is connected fluidically to the air calming chamber via a respective supply opening. In other words, at the other end the air ducts go into the air calming chamber via respective supply openings, which are spaced apart. The feature that the supply openings are spaced apart, i.e., for example are separated from one another in the fifth plane, means in particular that the supply openings are individual or separate openings and are not for instance a single large opening. The air from the air ducts can be led into the air calming chamber via the supply openings, so that the air calming chamber is suppliable with the air from the air ducts. The supply openings are for example formed in the delimiting element. Alternatively or additionally, the supply openings are configured as through openings, which pass through the delimiting element, in particular completely. The respective supply opening is for example in its peripheral direction delimited all round by the delimiting element, in particular by a corresponding wall of the delimiting element, preferably configured as a solid body. The feature that the supply openings are spaced apart may in particular be taken to mean that in particular along a spacing direction extending in the fifth plane, a wall region of the delimiting element is arranged between the supply openings. The foregoing and the following details regarding the separating element may normally also apply to the delimiting element, and vice versa. Thus, for example the delimiting element is a plate-like or plate-shaped component, which extends at least mainly, in particular completely, in the fifth plane and therefore is configured for example as a surface element.

In particular, the invention makes an especially simple air supply or ventilation of the internal space possible, in particular via a plurality of vents or air outlets configured as air outlet slots. In particular, flexible placement of air ducts can be achieved, via which the air can be led from the blower to the air calming chamber. Therefore it is possible for example to respond appropriately to space requirements of other, additional components. In particular, owing to the modular structure described above, the ventilation system according to the invention can be adapted particularly easily and appropriately to different space circumstances. In addition it is possible to use conventional air conditioning boxes with corresponding air outlets, also designated as air conditioning outlets, for central and side nozzles, to supply the air calming chamber by means of the air to be supplied to the internal space. The invention is based in particular on the following findings: In conventional air conditioning systems for motor cars, air is led from the air conditioning box via one or more air-conditioning outlets to air vents, also designated as nozzles, via which the air is finally supplied to the internal space, also designated as the passenger compartment of the vehicle. As a result, the internal space can for example be air-conditioned. The air is usually led from the air conditioning box to the air vents via individual air ducts from each air outlet of the air conditioning box to each air vent. Currently, in the internal space, on each side of the motor car, an air vent, also designated as side nozzle, and two to four air vents are fitted in the middle of the internal space, for example on or in an instrument panel and in particular in the middle thereof.

As additional background information, displays for motor cars, in particular in the transverse direction of the vehicle, are getting bigger and bigger and therefore wider and wider and may optionally occupy the total width of the motor car extending in the transverse direction of the vehicle or of the internal space. Against this background, so that a particularly advantageous ventilation of the internal space and therefore particularly advantageous ambient conditions can be achieved in the internal space, at least one gap or several gaps in the edge region of the display, also designated as edge, are used as air vents, i.e., as the aforementioned air outlets, to allow air to flow into the internal space. The respective air outlet, preferably configured as a slot or air outlet slot, is delimited for example on the one hand by the display or edge region thereof and on the other hand by an internal component of the ventilation system or of the motor car. The internal component may be formed separately from the display and therefore be connected indirectly, in particular directly, to the display. In this kind of supply of the internal space with air, if the conventional design described above is retained, in which one air duct is used per nozzle, i.e., per air outlet slot, to supply the air that is to be supplied to the internal space via the respective air outlet slot, this results in a particularly large space requirement for the ventilation system. This can now be avoided by the invention. The invention makes it possible to manage, with existing air ducts that have been used up to now, to supply middle and/or side nozzles with air, to supply air to the at least one air outlet or preferably the several air outlets of the ventilation system particularly advantageously via the air calming chamber and the air distribution chamber. In particular it is possible to connect the air outlets of the ventilation system according to the invention to the box, also designated as air distribution box, which in particular is arranged behind the display, so that the preferably several air outlets of the ventilation system can be supplied with air from the air distribution box favourably with respect to space. Therefore an especially high flexibility in operation of the ventilation system is achieved overall.

The air distribution chamber and the air calming chamber form a chamber system, which can be supplied with air particularly easily, and favourably with respect to space. Actual distribution or splitting of the air that is led into the chamber system, over the preferably several air outlets of the ventilation system, configured in particular as air outlet slots, takes place for example by means of the chamber system, in particular by the air distribution plane, and not by air ducts or lines extending through the air calming plane to the box wherein a pre-distribution of the air already takes place through the channels in the chambers defined by the partitions. In this way, the space requirement, in particular behind the air calming plane, can be kept small.

Overall, it can be seen that the air calming chamber, with respect to the air distribution chamber, is an additional chamber, which serves for air calming and for fitting the line elements and therefore the air ducts thereof particularly appropriately and therefore flexibly, i.e., to be connected fluidically to the air calming chamber. As a result, it is for example possible to respond appropriately and flexibly to different space circumstances and therefore to different vehicle variants.

Finally, it has been shown to be particularly advantageous if the respective supply opening is offset at least partially relative to the through hole, in particular in the fifth plane. This may ensure particularly advantageous and pleasant ventilation of the internal space.

A second aspect of the invention relates to a motor car, preferably configured as a passenger car, with at least one ventilation system, which is preferably a ventilation system according to the invention according to the first aspect of the invention. The ventilation system has at least one electronic display, which has at least one display area for displaying information. The ventilation system comprises in addition an air distribution chamber arranged on a back of the display turned away from the display area and suppliable with air. In addition the ventilation system has at least one air outlet adjacent to an edge region of the display, through which air from the air distribution chamber can flow, via which the air flowing through the air outlet can be led into the internal space of the motor car. The air outlet is delimited at least partially directly by the edge region of the display.

In order to achieve a particularly advantageous ventilation of the internal space, it is envisaged according to the invention that the ventilation system has at least one air calming chamber arranged on a second back of the air distribution chamber turned away from the back of the display and separated fluidically at least partly, in particular primarily, from the air distribution chamber, which is connected fluidically to the air distribution chamber via at least one through hole, via which the air distribution chamber is suppliable with the air that is to be supplied to the internal space, in particular from the air calming chamber. Advantages and advantageous configurations of the first aspect of the invention are to be regarded as advantages and advantageous configurations of the second aspect of the invention and vice versa.

Further advantages, features and details of the invention can be seen from the following description of preferred embodiment examples and from the drawings. The features and combinations of features stated above in the description and the features and combinations of features stated hereunder in the description of the figures and/or only shown in the figures are not only usable in the combination given in each case, but also in other combinations or alone, while remaining within the scope of the invention.

DETAILED DESCRIPTION OF THE DRAWINGS

In the figures, identical or functionally equivalent elements are provided with the same reference symbol.

Figure 1:
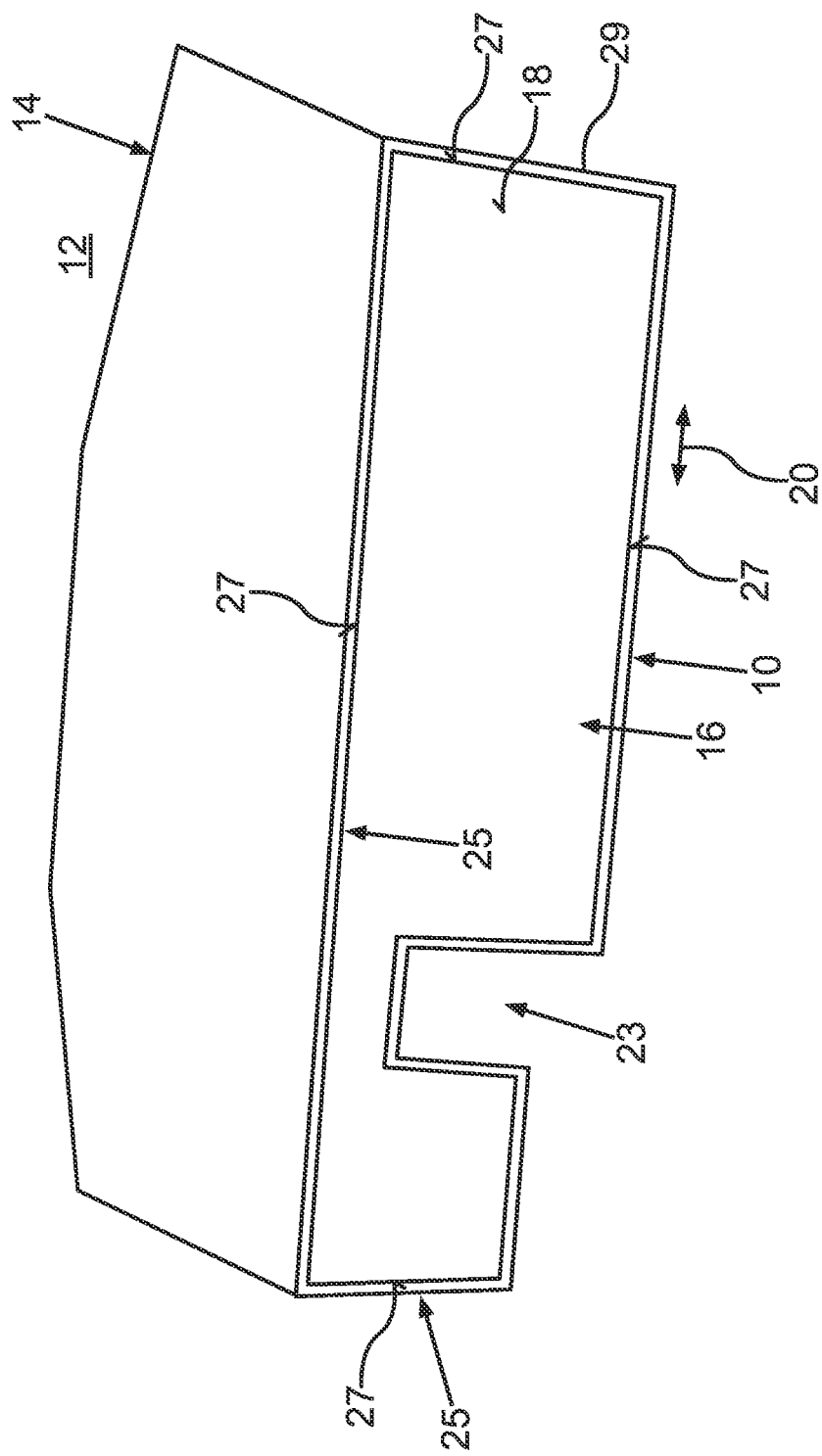
FIG. 1 is a schematic perspective front view of a ventilation system according to the invention for a motor car.

FIG. 1 is a schematic perspective front view of a ventilation system 10 for a motor car, preferably configured as a passenger car. This means that in its fully manufactured state the motor car has the ventilation system 10, which is arranged in the internal space 12 of the motor car. Moreover, an instrument panel 14 of the motor car is arranged in the internal space 12, wherein the ventilation system 10 is for example arranged or held or fitted on the instrument panel 14. The ventilation system 10 has at least one electronic display 16, which has at least one display area 18. The display area 18 extends in a first plane, which is also designated as the display plane 70. On the display 16, in particular on the display area 18 and therefore in the display plane 70, information, in particular in the form of letters and/or symbols and/or images can be displayed, in particular electrically or electronically. In particular, the display 16 has a width extending in the transverse direction of the vehicle that is more than 50% of the width of the internal space 12 extending in the transverse direction of the vehicle. The transverse direction of the vehicle is indicated in FIG. 1 with a double-headed arrow 20. In particular, the width of the display 16, in particular of the display area 18, is more than 50%, in particular more than 70% and preferably more than 80% and quite preferably more than 90% of the width of the internal space 12. It can also be seen from FIG. 1 that the ventilation system 10, in particular the display 16, has an opening 23, through which, for example in the fully manufactured state of the motor car, a steering column of the motor car extends. The opening 23 may also be omitted, for example in the case of vehicles without a steering column.

Figure 2:
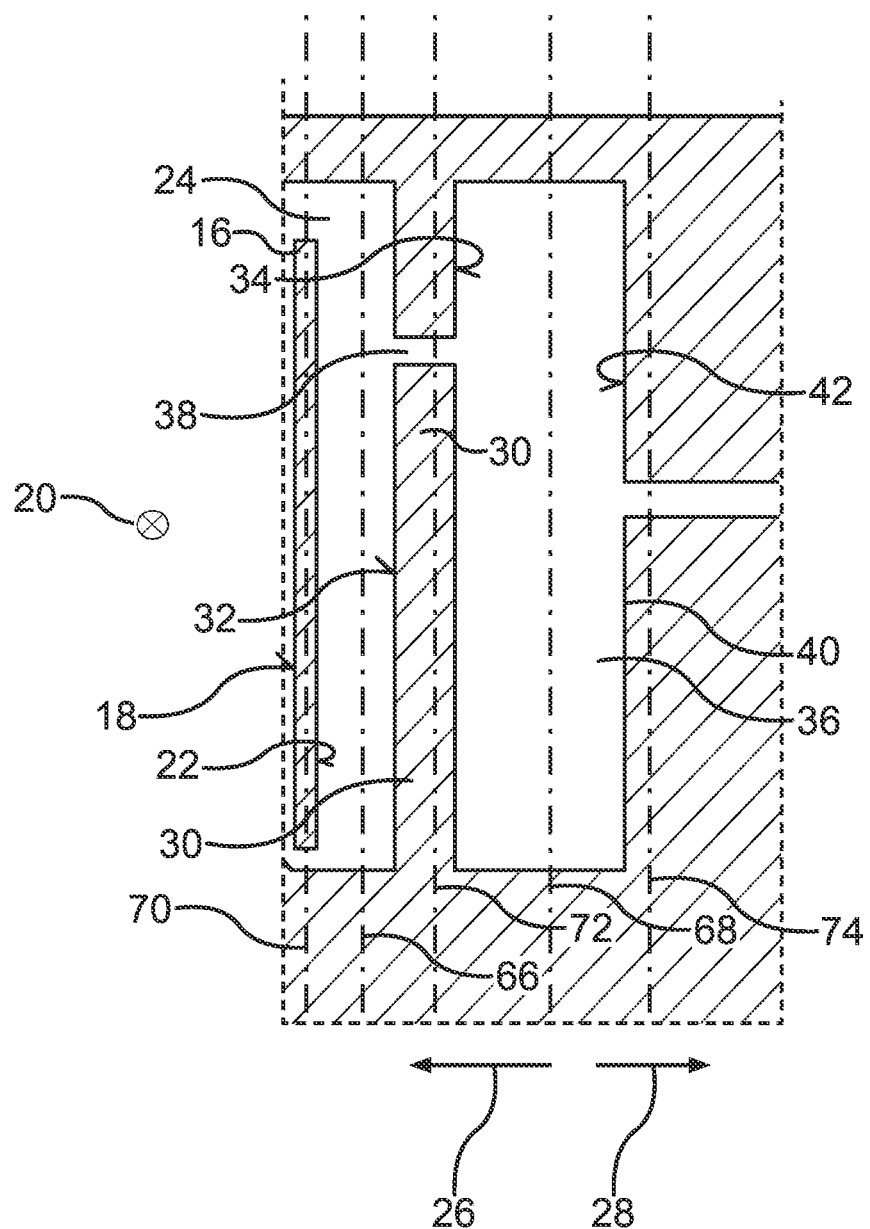
FIG. 2 is a detail of a schematic sectional side view of the ventilation system according to FIG. 1.

As can be seen from FIG. 2, the display 16 has a back 22 turned away from the display area 18, which is therefore also turned away from the internal space 12. In particular, the back 22 is turned away in a direction of the display area 18, wherein the direction extends perpendicularly to the display plane 70. At least one air distribution chamber 24 of the ventilation system 10 is arranged on the back 22. As is explained in more detail hereunder, the air distribution chamber 24 is suppliable with air, which is to be supplied or is supplied to the internal space 12 by means of the ventilation system 10. As can be seen from FIG. 2, the air distribution chamber 24 is delimited directly by the display 16, in particular by the back 22, in a first delimiting direction extending in parallel to the aforementioned direction and indicated with an arrow 26 in FIG. 2. Therefore, for example air that is received in the air distribution chamber 24 or flows through the air distribution chamber 24, comes into contact with the back 22 directly. Alternatively, insulation layers or air gaps may also be arranged between the air in the air distribution chamber 24 and the back 22. The back 22 is also designated as the first back.

In a second delimiting direction extending in parallel to the aforementioned direction, opposite the first delimiting direction 26 and indicated with an arrow 28 in FIG. 2, the air distribution chamber 24 is delimited by a separating element 30, which is configured as a solid body and is inherently rigid or dimensionally stable. In particular, in the second delimiting direction 28, the air distribution chamber 24 is delimited directly by a first front side 32 of the separating element 30, wherein the front side 32 faces the first back 22 and therefore the display 16. The air flowing through air distribution chamber 24 or received in the air distribution chamber 24 may therefore come into contact with the front side 32 directly.

Now, in order to be able to ventilate the internal space 12 particularly advantageously, the ventilation system 10 has at least one air calming chamber 36 arranged on a second back 34 of the air distribution chamber 24 turned away from the first back 22 or of the separating element 30, which in the direction extending perpendicularly to the first plane is separated fluidically at least partly, in particular primarily, from the air distribution chamber 24. Moreover, in the direction, the air calming chamber 36 is separated at least partly, in particular primarily, from the air distribution chamber 24 by the separating element 30.

Figure 3:
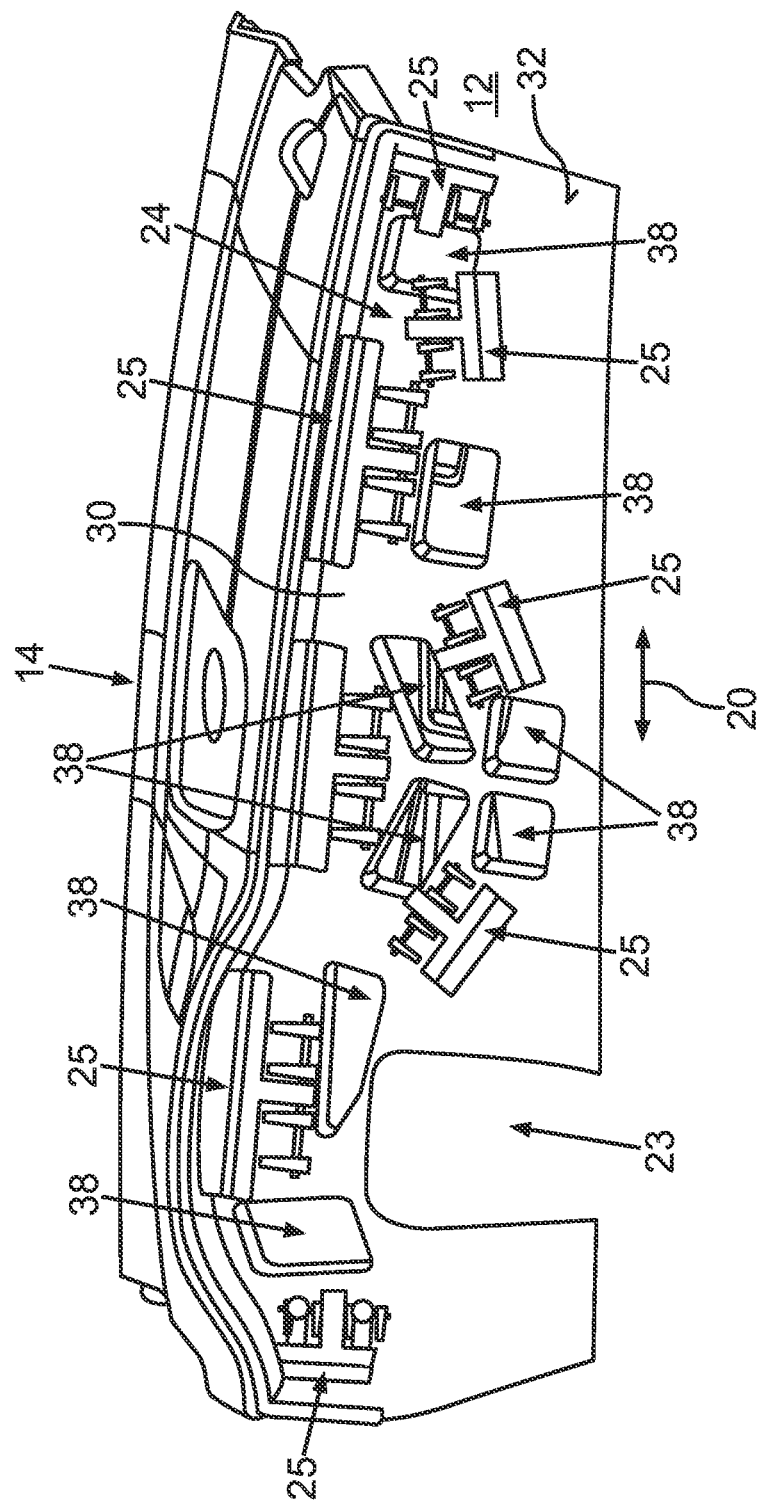
FIG. 3 is a detail of a schematic and perspective front view of the ventilation system according to a first embodiment.

As can be seen particularly well from FIG. 3, the ventilation system 10 has several air outlets in the form of air outlet slots 25, which are contiguous with an edge region 27 of the display 16, in particular in the vertically upward direction of the vehicle and/or in the vertically downward direction of the vehicle and/or in the transverse direction of the vehicle to the left and/or in the transverse direction of the vehicle to the right, through which air from the air distribution chamber 24 can flow. As a result, via the air outlet slots 25, the air flowing through the air outlet slots 25 can be led from the air distribution chamber 24 into the internal space 12. The respective air outlet slot 25 is therefore also designated as vent or air vent, via which the air from the air distribution chamber 24 is led into the internal space 12. The internal space 12 is ventilated as a result. The feature that the respective air outlet is configured as the respective air outlet slot 25 means in particular that the air outlet or the air outlet slot 25 is a gap or slot, which has a longitudinal direction of extension and therefore, in particular in the first plane, is considerably longer than high or wide. In particular, the respective air outlet slot 25 is at least twice as long as high or wide.

The respective air outlet slot 25 is for example delimited on the one hand directly by the edge region 27 of the display 16, in particular of the display area 18. On the other hand the respective air outlet slot 25 is for example delimited by an internal component 29 directly, wherein for example the internal component 29 is spaced from the edge region 27 in the first plane. Therefore the respective air outlet slot 25 is arranged, in particular in the display plane 70, between the edge region 27 and the internal component 29.

As can also be seen from FIG. 3, the separating element 30 has several through holes 38, configured as through openings, which completely penetrate the separating element 30, in particular along the direction. The air calming chamber 36 is connected fluidically to the air distribution chamber 24 via the through holes 38. The air calming chamber 36 is suppliable with the air that is to be supplied or is supplied to the internal space 12. Therefore, via the through holes 38, the air to be supplied to the internal space and the air led first into the air calming chamber 36 can be led from the air calming chamber 36 into the air distribution chamber 24, so that via the through holes 38, the air distribution chamber 24 is suppliable or is supplied with the air that is to be supplied to the internal space from the air calming chamber 36. Moreover, the air calming chamber 36 is delimited in the first delimiting direction 26 directly by the separating element 30, in particular by the second back 34, so that the air received in the air calming chamber 36 or the air flowing through the air calming chamber 36 comes into contact with the second back 34 directly.

It can be seen particularly well that the air distribution chamber 24 extends in an air distribution plane 66, which is also designated as second plane and extends in parallel to the first plane. The air calming chamber 36 extends in an air calming plane 68, which is also designated as third plane and extends in parallel to the first plane and in parallel to the second plane. Therefore the aforementioned direction extending perpendicularly to the first plane also extends perpendicularly to the second plane and perpendicularly to the third plane. The separating element 30 extends in a separating plane 72, which is also designated as fourth plane and extends in parallel to the first plane, in parallel to the second plane and in parallel to the third plane. In particular, the separating element 30 extends at least mainly, in particular completely, in the fourth plane, so that more than half of the separating element 30 extends in the fourth plane. The separating element 30 is then arranged in the aforementioned direction, which also extends perpendicularly to the fourth plane, between the air distribution chamber 24 and the air calming chamber 36. As the through holes 38 are formed in the separating element 30, the through holes 38 also extend in the fourth plane. The respective through hole 38 has a passage, along which the air from the air calming chamber 36 can flow through the respective through hole 38 and therefore can flow into the air distribution chamber 24. Moreover, the direction of the passage extends in parallel to the aforementioned direction and therefore perpendicularly to the fourth plane.

Finally, the ventilation system 10 has a delimiting element 40, which can be seen particularly well from FIG. 2, which is spaced along the direction from the separating element 30. In the second delimiting direction, the air calming chamber 36 is delimited directly by the delimiting element 40, in particular by a second front side 42 of the delimiting element 40, so that the air received in the air calming chamber 36 or the air flowing through the air calming chamber 36 comes into contact with the delimiting element 40, in particular its second front side 42, directly. The second front side 42 faces the second back 34, so that the front side 42 faces the separating element 30. The separating element 30 and/or the delimiting element 40 are solid bodies and/or are inherently rigid. The display 16 is also preferably inherently rigid. The display 16, the separating element 30 and the delimiting element 40 are preferably components configured separately from one another and joined together at least indirectly, which may be spaced apart in pairs in particular along the direction. As can be seen particularly well from FIG. 2, this creates a sandwich structure, i.e., a sandwich construction of the ventilation system 10. The sandwich structure comprises the display 16, in particular the first back 22, as first covering surface or covering layer, the separating element 30 as second covering surface or covering layer and the delimiting element 40 as third covering surface or covering layer. The air distribution chamber 24 is a first core or a first core layer, which is arranged in the direction between the display 16 and the separating element 30. The display 16 and the separating element 30 are therefore covering layers or covering surfaces for the first core. The air calming chamber 36 is a second core or a second core layer of the sandwich structure, wherein the separating element 30 and the delimiting element 40 are covering surfaces or covering layers for the second core. With this sandwich structure, a particularly flat construction can be created, in particular along the direction. In addition, this may result in a particularly modular structure, so that the ventilation system 10 can be adapted particularly flexibly and appropriately to different space circumstances, in particular behind the display 16.

FIG. 3 shows a first embodiment of the ventilation system 10. In the first embodiment, a single-chamber system is provided, with respect to the air distribution chamber 24. The air distribution chamber 24 is in this case configured as exactly one large, continuous chamber, which in the second plane, i.e., along a separating direction extending in the second plane 66, is not divided into several partial chambers.

Figure 4:
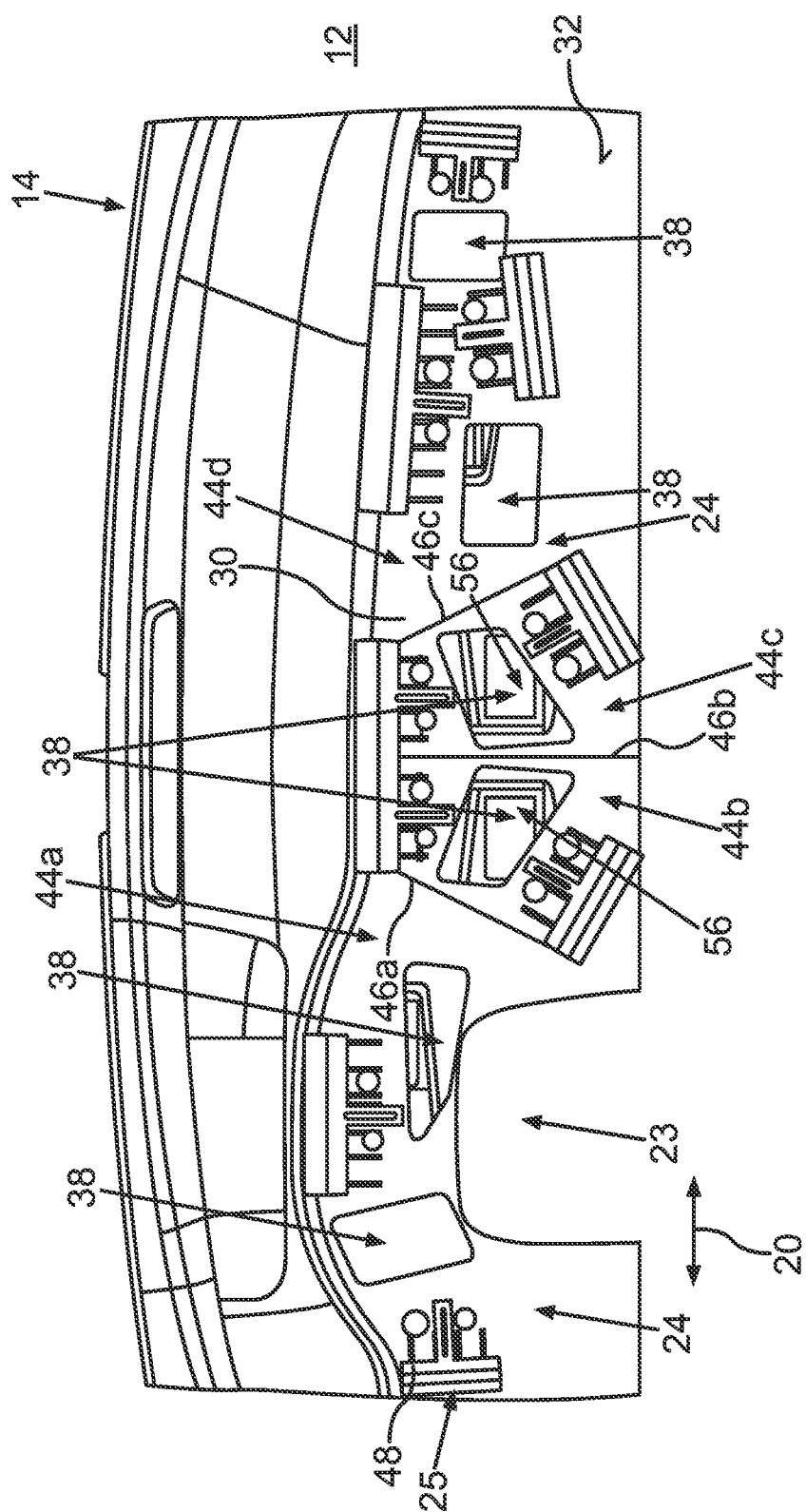
FIG. 4 is a schematic front view of the ventilation system according to a second embodiment.

In contrast, FIG. 4 shows a second embodiment. In the second embodiment, the air distribution chamber 24 is divided into several partial chambers 44a-d arranged adjacently in the second plane 66, in particular in the second plane 66 and therefore in the aforementioned separating direction extending in the second plane 66. Moreover, the air distribution chamber 24 is divided in the second plane 66 by respective partitions 46a-c into the partial chambers 44a-d, so that the respective partitions 46a-c are arranged in the separating direction between the respective partial chambers 44a-d. The partitions 46a-c are impermeable for the air arranged in the air distribution chamber 24, so that the partial chambers 44a-d are completely separated from one another fluidically in the separating direction by the partitions 46a-c. This means in particular that the air received in the air distribution chamber 24 cannot flow to and fro, i.e., be transferred, within the air distribution chamber 24 between the partial chambers 44a-d.

Moreover, at least one through hole 38 is provided for each partial chamber 44a-d. Two through holes 38 are assigned to the partial chamber 44a, via which the partial chamber 44a is connected fluidically to the air calming chamber 36. Exactly one through hole 38 is assigned to the respective partial chamber 44b or 44c, via which the respective partial chamber 44b or 44c is connected fluidically to the air calming chamber 36. Two through holes 38 are assigned to the partial chamber 44d, via which the partial chamber 44d is connected fluidically to the air calming chamber 36.

In addition, it can be seen from FIGS. 1 and 4 that the display 16, in particular the display area 18, has a first area or first surface area. The air distribution chamber 24 has a second area or a second surface area in the air distribution plane 66, and the air calming chamber 36 has a third area or a third surface area in the air calming plane 68, wherein the second area is a large part of the first area and the third area is in its turn a large part of the second area. Alternatively or additionally, the air distribution chamber 24 has, in the air distribution plane 66, a second width extending in the transverse direction of the vehicle, and the air calming chamber 36 has, in the air calming plane 68, a third width extending in the transverse direction of the vehicle. The first width of the display 16, in particular of the display area 18, extending in the transverse direction of the vehicle, is also designated as the first width. For example, the third width is more than 50% of the first width.

Figure 6:
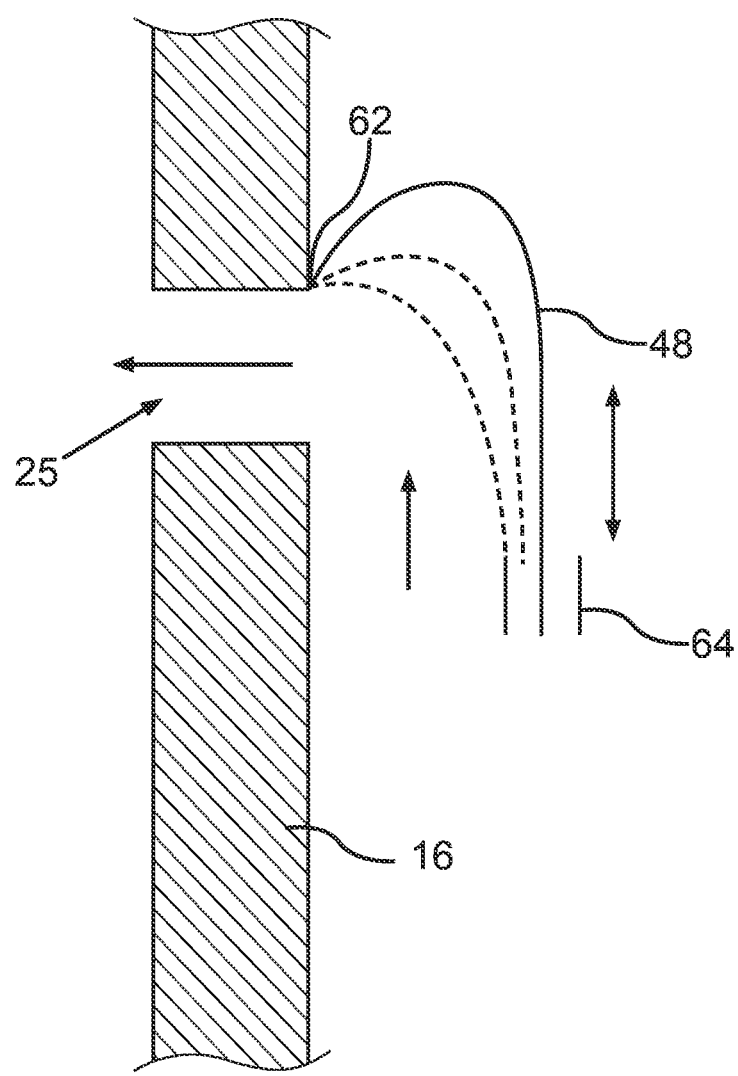
FIG. 6 is a detail of a further, schematic sectional side view of the ventilation system.

Moreover, it can be seen particularly well from FIGS. 3 and 4 that a setting element 48 is assigned to the respective air outlet slot 25. By means of the setting element 48, a discharge direction, in which the air flowing through the respectively assigned air outlet slot 25 flows into the internal space, can be set, i.e., varied. For this purpose, the respective setting element 48—as can be seen from FIG. 6—is a flexible or elastically deformable element, which is mounted swivelling in a bearing 62 and sliding in a bearing 64, in particular sliding longitudinally. By longitudinal displacement of the setting element 48 in the bearing 64, different curvatures of the setting element 48 can be set, so that the discharge direction can be adjusted. In particular, the setting element 48 can be displaced in the bearing 64 in a direction of movement. The direction of movement preferably extends in parallel to the separating plane 72 (fourth plane). In particular, the respective setting element 48 is arranged, in particular in the aforementioned direction, between the separating element 30 and the display 16, in particular in the air distribution chamber 24.

Figure 5:
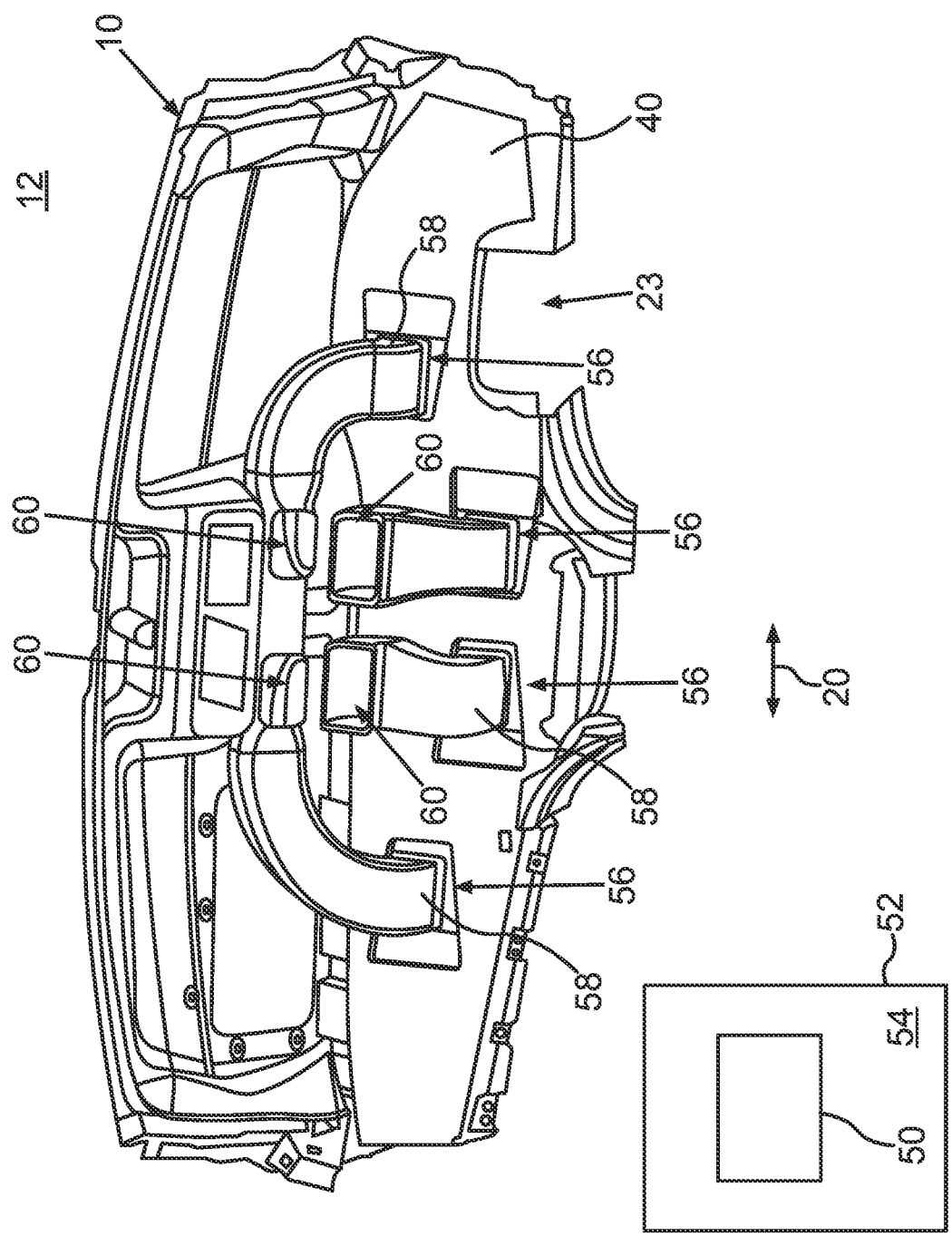
FIG. 5 is a detail of a schematic and perspective rear view of the ventilation system.

It can be seen from FIG. 5 that the ventilation system 10 has a blower 50, shown particularly schematically in FIG. 5. The blower 50 is arranged outside of the air distribution chamber 24 and outside of the air calming chamber 36. In particular, the blower 50 is arranged in a box 52, also designated as air distribution box or air-conditioning box. The air to be supplied to the internal space 12 is to be delivered or is delivered by means of the blower 50. Therefore, for example the air to be supplied to the internal space 12 can flow at least through a part of the box 52. The box 52 delimits for example a receiving space 54, in which the blower 50 is arranged. Therefore the air to be supplied to the internal space 12 and that is delivered by means of the blower 50 can flow at least through a part of the receiving space 54.

The delimiting element 40 preferably extends in a delimiting plane 74, which is also designated as fifth plane. In addition, it can be seen from FIG. 5 that the delimiting element 40 has supply openings 56, configured as through openings, which pass completely through the delimiting element 40 and extend in the delimiting plane 74 (fifth plane). Therefore the respective supply opening 56 has a direction of passage, which extends perpendicularly to the fifth plane. Along the direction of passage of the respective supply opening 56, the air to be supplied to the internal space can flow through the respective supply openings 56.

The respective supply opening 56 is for example assigned a respective line element 58, which has a respective air duct 60, through which air to be supplied to the internal space 12 can flow. At one end, the respective air duct 60 is connected fluidically to the receiving space 54, so that the air delivered by means of the blower 50 can be introduced or is introduced at one end into the respective air duct 60. At the other end, the respective air duct 60 opens via the respective assigned supply opening 56 into the air calming chamber 36. In other words, at the other end the respective air duct 60 is connected fluidically to the air calming chamber 36 via the respective supply opening 56. Therefore the air delivered by means of the blower 50 flows at one end into the air ducts 60. Subsequently, the air that flowed at one end into the air ducts 60 can flow through the air ducts 60 and therefore through the line elements 58. At the other end, the air that flowed into the air ducts 60 can be vented from the air ducts 60 and then flow into the air calming chamber 36. By means of the air calming chamber 36, the air that flowed into the air calming chamber 36 is first calmed. Next, the air from the air calming chamber 36 can flow into the air distribution chamber 24. By means of the air distribution chamber 24, the air that flowed into the air distribution chamber 24 is then divided up onto the and in particular to the air outlet slots 25.

Since in the second embodiment exactly four partial chambers 44a-d are provided, in the second embodiment a four-chamber system is created, with respect to the air distribution chamber 24. The number of air outlet slots 25, also designated as nozzles, for injecting the air into the internal space 12 can be freely selected and may in particular depend on an adjustment principle, according to which the respective flow cross-section is varied. The adjustment principle is also variable or is to be matched to the requirements.

For example, as can be seen from FIG. 4, the supply openings 56 are at least partially offset relative to the through holes 38 in the delimiting plane 74. Through the use of the air distribution chamber 24 and the air calming chamber 36, the several air outlet slots 25 can be supplied particularly advantageously and in particular at least substantially uniformly with the air to be supplied to the internal space 12, and by means of only a small number of line elements 58. As a result, for example the space requirement for the ventilation system 10 behind the delimiting element 40 can be kept particularly small. In addition, the air in the box 52 can be led appropriately to the air calming chamber 36, so that for example the ventilation system 10 can be adapted appropriately and flexibly to different space circumstances.

The display area and the covering surfaces are also designated as surfaces, wherein the surfaces may extend in parallel to one another, although they do not necessarily have to extend in parallel to one another. The surfaces may, in particular slightly, extend obliquely to one another. In other words at least two of the surfaces may extend, in particular slightly, obliquely to one another. The planes need not necessarily extend in parallel to one another, but may, in particular slightly, extend obliquely to one another.

The invention claimed is:

1. A ventilation system for a motor car, comprising:
   an electronic display which has a display area for displaying information, wherein the display area extends in a display plane;
   an air distribution chamber disposed on a back of the electronic display, wherein the air distribution chamber is turned away from the display area and is supplied with air;
   an air outlet in the display plane and contiguous with an edge region of the electronic display, wherein the air outlet is at least partially delimited directly by the edge region of the electronic display, and wherein air from the air distribution chamber is flowable through the air outlet and into an internal space of the motor car; and
   an air calming chamber disposed on a back of the air distribution chamber turned away from the back of the electronic display, wherein the air calming chamber is at least partially separated fluidically from the air distribution chamber and reduces air flow velocity, wherein the air calming chamber is connected fluidically to the air distribution chamber via at least one through hole, wherein via the at least one through hole the air distribution chamber is supplied with air to be supplied to the internal space from the air calming chamber, and wherein the through hole is delimited peripherally in its entirety by a separating element that otherwise fluidically separates the distribution chamber and the air calming chamber.

2. The ventilation system according to claim 1, wherein the air distribution chamber extends in an air distribution plane and wherein the air calming chamber extends in an air calming plane that extends in parallel to the air distribution plane.

3. The ventilation system according to claim 2, wherein the display plane is parallel to the air distribution plane and to the air calming plane.

4. The ventilation system according to claim 2, wherein the air distribution chamber and the air calming chamber are separated from each other in a separating direction extending perpendicularly to the air distribution plane and perpendicularly to the air calming plane at least partially by the separating element which has the at least one through hole configured as a passage and wherein the separating element extends in a separating plane disposed in the separating direction between the air distribution plane and the air calming plane and extends in parallel to the air distribution plane and in parallel to the air calming plane.

5. The ventilation system according to claim 1, wherein the air distribution chamber is subdivided into a plurality of partial chambers disposed adjacent to each other and wherein each of the plurality of partial chambers has at least one through hole via which the respective partial chamber is connected fluidically to the air calming chamber.

6. The ventilation system according to claim 5, wherein the air distribution chamber extends in an air distribution plane, wherein the air calming chamber extends in an air calming plane that extends in parallel to the air distribution plane, wherein the plurality of partial chambers are separated from one another in a subdividing direction extending in the air distribution plane by a respective partition, and wherein the plurality of partial chambers are completely separated from one another fluidically in the subdividing direction by the respective partitions.

7. The ventilation system according to claim 1, wherein the air distribution chamber and the air calming chamber extend on the back of the electronic display at least over a main area thereof.

8. The ventilation system according to claim 1, further comprising:
   a blower disposed outside of the air distribution chamber and outside of the air calming chamber; and
   a line element with an air duct, wherein air from the blower is introducible into the air duct and wherein air in the air duct is introducible into the air calming chamber via a supply opening.

9. The ventilation system according to claim 8, wherein the supply opening is at least partially offset relative to the at least one through hole.

10. A motor car, comprising:
    the ventilation system according to claim 1.

* * * * *